(12) United States Patent
Khanna et al.

(10) Patent No.: US 8,320,884 B1
(45) Date of Patent: Nov. 27, 2012

(54) LIMITING USER DEVICE FUNCTIONALITY DURING MOTOR VEHICLE OPERATION

(75) Inventors: Nitin M. Khanna, Arlington, TX (US); Umashanker Dheenathayalu, Irving, TX (US); Ryan Evans, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/325,224

(22) Filed: Dec. 14, 2011

(51) Int. Cl.
| | |
|---|---|
| H04M 3/00 | (2006.01) |
| H04M 3/16 | (2006.01) |
| H04M 1/68 | (2006.01) |
| H04M 1/66 | (2006.01) |
| H04B 1/38 | (2006.01) |
| G09G 5/00 | (2006.01) |
| G06F 3/041 | (2006.01) |
| G08B 29/00 | (2006.01) |

(52) U.S. Cl. ........ 455/411; 455/418; 455/557; 345/156; 345/173; 340/506

(58) Field of Classification Search ................... 455/418, 455/557, 411; 345/156, 173; 340/506
See application file for complete search history.

(56) References Cited

U.S. PATENT DOCUMENTS

| 2005/0024341 A1* | 2/2005 | Gillespie et al. ............. 345/173 |
| 2010/0216509 A1* | 8/2010 | Riemer et al. ................ 455/557 |

* cited by examiner

Primary Examiner — Jinsong Hu
Assistant Examiner — Opiribo Georgewill

(57) ABSTRACT

A user device receives information associated with the user device, and detects movement of the user device. The user device also determines whether the movement is greater than a threshold velocity, and determines, when the movement is greater than the threshold velocity, whether the user device is located in a moving motor vehicle based on the information associated with the user device. The user device further places functionality of the user device in a semi-locked state when the user device is located in a moving motor vehicle.

21 Claims, 11 Drawing Sheets

LIMITING USER DEVICE FUNCTIONALITY DURING MOTOR VEHICLE OPERATION

BACKGROUND

Distracted driving occurs when a driver has something other than driving on his mind. For example, distracted driving may occur when a driver is texting or talking via a mobile user device (e.g., a smart phone, a cell phone, etc.) while driving a motor vehicle. Texting while driving is the act of composing, sending, and/or reading text messages or emails, or making other similar use of the Internet, using a mobile user device, while operating a motor vehicle. Talking and/or texting while driving has been viewed by many people and authorities as dangerous, and has been the cause of motor vehicle accidents. Many areas have outlawed texting while operating a motor vehicle. Despite such laws, motor vehicle operators continue to text while driving.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a user device to enter a semi-locked state when the user device is determined to be located within a moving motor vehicle. The semi-locked state may permit some user device functionality (e.g., placing a phone call) with one hand, but may prevent other user device functionality (e.g., texting, features that require menu operations, features that require keypad operations, etc.) with one hand. However, when the user device is in the semi-locked state, a user may utilize the other user device functionality with two hands. For example, the user may utilize one hand to continuously contact a soft button (e.g., provided on a menu or keypad displayed by the user device) or a hard button (e.g., a mechanical keypad key, a camera button, etc. of the user device). The semi-locked state of the user device may be disabled while the soft button or hard button is continuously contacted, and the user may utilize another hand to access the other user device functionality.

The systems and/or methods may prevent a driver of a motor vehicle from utilizing user device functionality that is distracting since the driver may need at least one hand to operate the motor vehicle. In one example, such an arrangement may prevent the driver from texting; emailing; reading emails, news, text messages, social media information, etc.; and/or performing other distracting user device functionality while operating the motor vehicle. In another example, the systems and/or methods may force the driver of the motor vehicle to utilize voice commands to access features of the user device instead of using one or two hands. Passengers in a motor vehicle may still be able access all of the user device functionality since the passengers may have both hands free to disable the semi-locked state and to manipulate the user device.

In one example, a remote server device, or other types of computation and communication devices, may determine that the user device is in a moving motor vehicle, and may remotely place the user device in the semi-locked state (e.g., to minimize tampering). The user device may provide permission to access calendar/social media information if such information is utilized by the remote server device. Alternatively, or additionally, information received from motor vehicle control and/or navigation systems may be utilized to determine whether the user device is in a moving motor vehicle.

In one example implementation, a user device, such as a mobile computation and/or communication device, may receive and/or retrieve information associated with the user device, such as a location of the user device, calendar information associated with a user of the user device, social media information associated with the user, etc. The user device may detect movement of the user device, and may determine whether the movement is greater than a threshold velocity, such as a velocity indicating that the user device is in a moving motor vehicle. If the movement is less than or equal to the threshold velocity, the user device may determine that the user device is stationary, and may maintain functionality of the user device. If the movement is greater than the threshold velocity, the user device may determine whether the user device is located in a moving motor vehicle based on the received/retrieved information. If the user device is located in a moving motor vehicle, the user device may place the user device in a semi-locked state that prevents some functionality of the user device. If the user device is not located in a moving motor vehicle, the user device may maintain functionality of the user device.

As used herein, the term "user" is intended to be broadly interpreted to include a user device or a user of a user device. The terms "motor vehicle" and "vehicle," as used herein, are intended to be broadly interpreted to include an automobile, a van, a truck, a motorcycle, a bus, etc.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
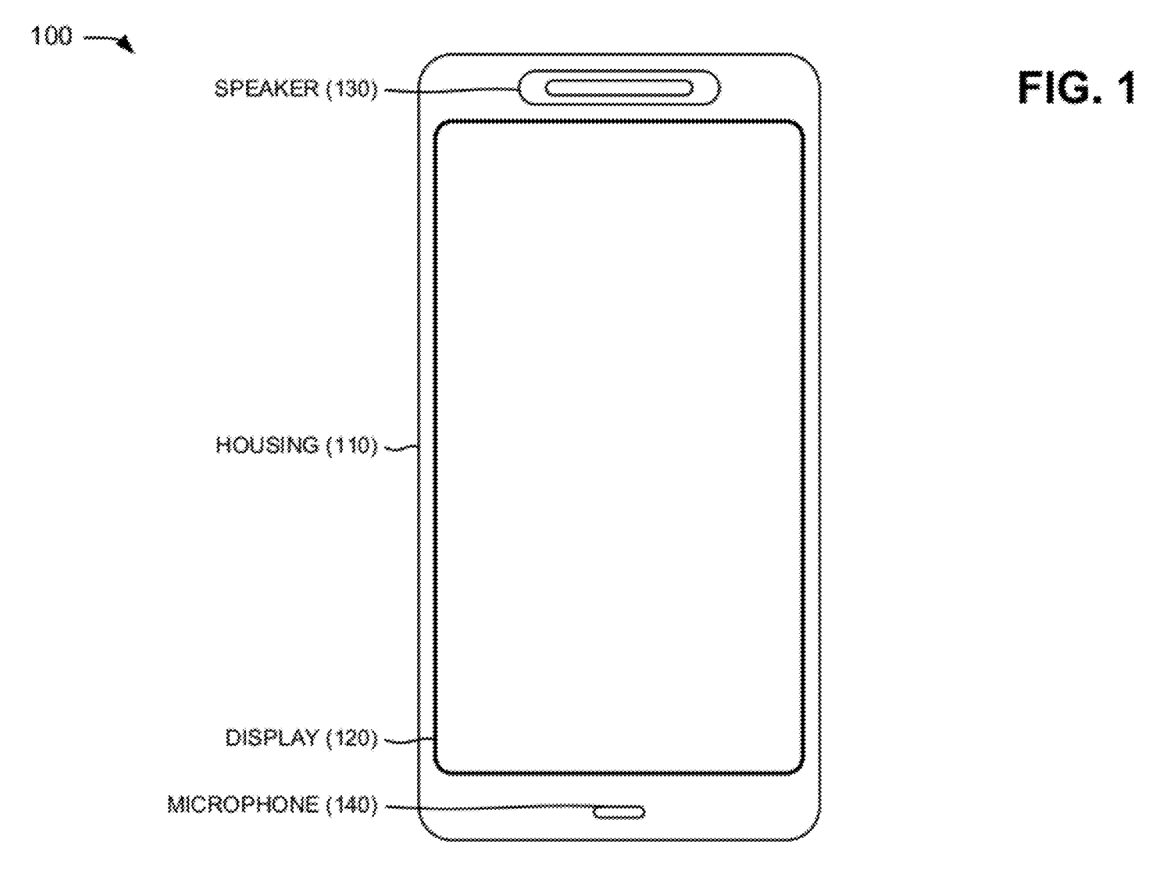
FIG. 1 is a diagram of example external components of a user device in which systems and/or methods described herein may be implemented.

FIG. 1 is a diagram of example external components of a user device 100 in which systems and/or methods described herein may be implemented. User device 100 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a smart phone; a laptop computer; a tablet computer; a portable gaming system; a global positioning system (GPS) device; or other types of mobile computation and/or communication devices. As further shown FIG. 1, user device 100 may include a housing 110, a display 120, a speaker 130, and/or a microphone 140.

Housing 110 may protect the components of user device 100 from outside elements. Housing 110 may include a structure configured to hold devices and components used in user device 100, and may be formed from a variety of materials. For example, housing 110 may be formed from plastic, metal, a composite, etc., and may be configured to support display 120, speaker 130, and/or microphone 140.

Display 120 may provide visual information to the user. For example, display 120 may display text input into user device 100; text, images, video, and/or graphics received from another device; and/or information regarding incoming or outgoing calls or text messages, emails, media, games, phone books, address books, the current time, etc. In one implementation, display 120 may include a touch screen display that may be configured to receive a user input when the user touches display 120. For example, the user may provide an input to display 120 directly, such as via the user's finger, or via other input objects, such as a stylus. User inputs received via display 120 may be processed by components and/or devices operating in user device 100. The touch screen display may permit the user to interact with user device 100 in order to cause user device 100 to perform one or more operations.

Speaker 130 may provide audible information to a user of user device 100. Speaker 130 may be located in an upper portion of user device 100, and may function as an ear piece when a user is engaged in a communication session using user device 100. Speaker 130 may also function as an output device for music and/or audio information associated with games and/or video images played on user device 100.

Microphone 140 may receive audible information from the user. Microphone 140 may include a device that converts speech or other acoustic signals into electrical signals for use by user device 100. Microphone 140 may be located proximate to a lower side of user device 100.

Although FIG. 1 shows example components of user device 100, in other implementations, user device 100 may contain fewer components, different components, differently arranged components, or additional components than depicted in FIG. 1. Alternatively, or additionally, one or more components of user device 100 may perform one or more other tasks described as being performed by one or more other components of user device 100.

Figure 2:
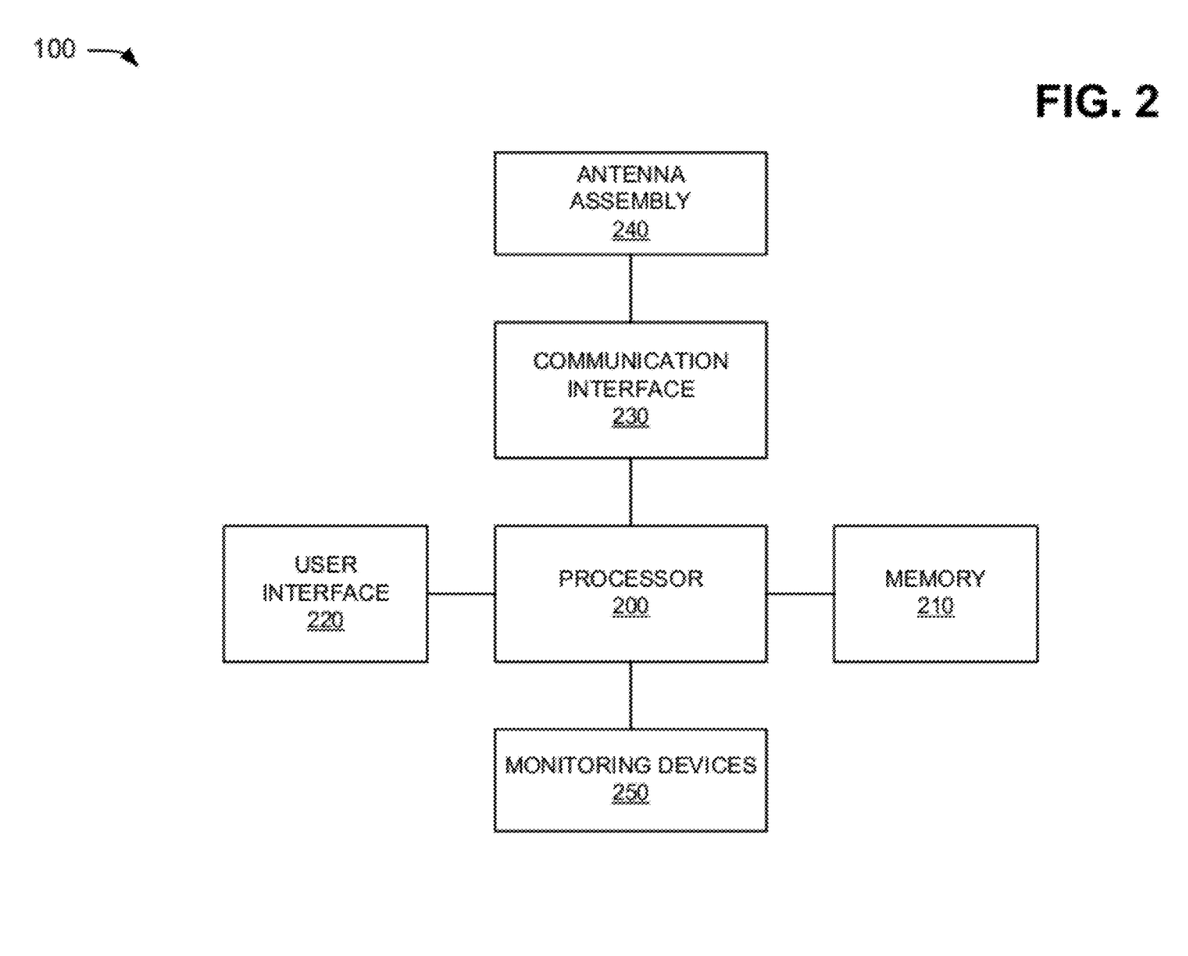
FIG. 2 is a diagram of example internal components of the user device of FIG. 1.

FIG. 2 is an example diagram of internal components of user device 100. As illustrated, user device 100 may include a processor 200, memory 210, a user interface 220, a communication interface 230, an antenna assembly 240, and/or one or more monitoring devices 250.

Processor 200 may include one or more processors or microprocessors that interpret and execute instructions. In other implementations, processor 200 may be implemented as or include one or more ASICs, FPGAs, or the like.

Memory 210 may include a RAM or another type of dynamic storage device that stores information and instructions for execution by processor 200, a ROM or another type of static storage device that stores static information and instructions for processor 200, and/or some other type of magnetic or optical recording medium and its corresponding drive for storing information and/or instructions.

User interface 220 may include mechanisms for inputting information to user device 100 and/or for outputting information from user device 100. Examples of input and output mechanisms might include buttons (e.g., control buttons, keys of a keypad, a joystick, etc.) or a touch screen interface (e.g., display 120) to permit data and control commands to be input into user device 100; a speaker (e.g., speaker 130) to receive electrical signals and output audio signals; a microphone (e.g., microphone 140) to receive audio signals and output electrical signals; a display (e.g., display 120) to output visual information (e.g., text input into user device 100); a vibrator to cause user device 100 to vibrate; etc.

Communication interface 230 may include, for example, a transmitter that may convert baseband signals from processor 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network.

Each of monitoring devices 250 may include one or more devices that measure movement of user device 100, a location of user device 100, a direction of user device 100, etc. For example, monitoring device 250 may include an accelerometer, a Doppler receiver, a GPS receiver, a gyroscope, a compass, etc. A GPS device may measure the location of user device 100, such latitude and longitude coordinates associated with user device 100. In one example, the GPS device may be used to determine a velocity of user device 100 based on locations of user device 100 over time. For example, user device 100 may be at a first location at a first time, and may be at a second location at a second time. The distance between the first and second locations and the difference between the first and second times may be used to calculate a velocity of user device 100. An accelerometer, a gyroscope, a compass, etc. may measure an orientation or a direction (e.g., tilted, turned, pointing to the north, south, east, west, etc.) of user device 100.

As described herein, user device 100 may perform certain operations in response to processor 200 executing software instructions contained in a computer-readable medium, such as memory 210. A computer-readable medium may be defined as a non-transitory memory device. A memory device may include space within a single physical memory device or spread across multiple physical memory devices. The software instructions may be read into memory 210 from another computer-readable medium, or from another device via communication interface 230. The software instructions contained in memory 210 may cause processor 200 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of user device 100, in other implementations, user device 100 may contain fewer components, different components, differently arranged components, or additional components than depicted in FIG. 2. Alternatively, or additionally, one or more components of user device 100 may perform one or more other tasks described as being performed by one or more other components of user device 100.

Figure 3:
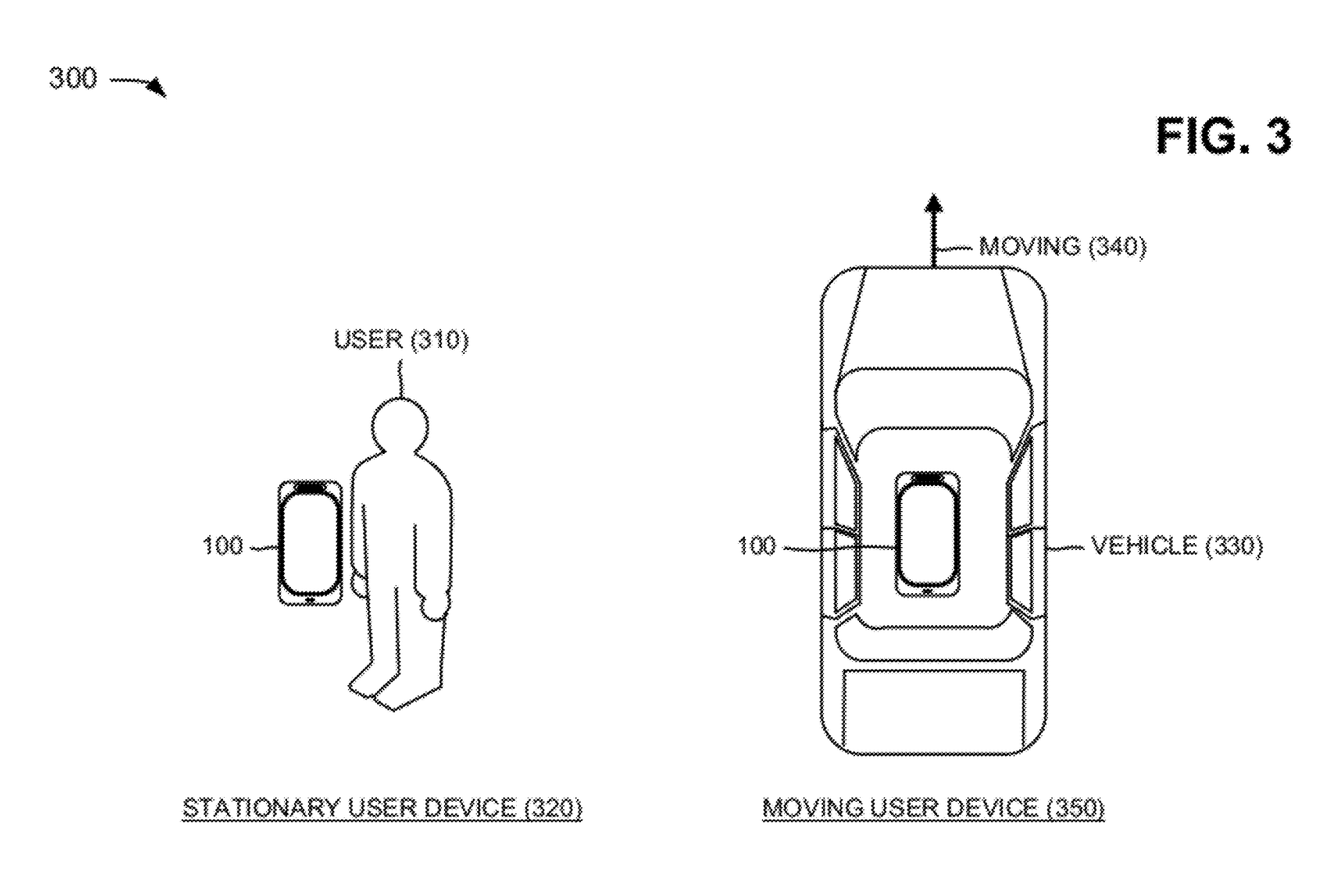
FIG. 3 is a diagram of example use scenarios associated with the user device of FIG. 1.

FIG. 3 is a diagram of example use scenarios 300 associated with user device 100. As shown in FIG. 3, in one scenario, user device 100 may be associated with a user 310 who is stationary, as indicated by reference number 320. The stationary user 310 may be standing, sitting, walking, running, etc. with user device 100. User device 100 may detect movement of user 310 (e.g., when user 310 is walking or running), but may determine that user device 100 is stationary if a velocity of user device 100 does not exceed a threshold velocity. For example, if the velocity of user device 100 is less than or equal to a threshold velocity of about fifteen (15) to twenty (20) miles per hour, user device 100 may determine that user device 100 is stationary. If user device 100 is determined to be stationary, all of the functionality of user device 100 may be maintained. In other words, user device 100 may not be placed in the semi-locked state when user device 100 is determined to be stationary.

As further shown in FIG. 3, in another scenario, user device 100 may be associated with a vehicle 330 (e.g., a car, a truck, a van, etc.) that is moving in a particular direction 340. In such a scenario, user device 100 may detect movement of user device 100 based on information received from monitoring devices 250 (FIG. 2). User device 100 may determine whether user device 100 is moving greater than a threshold velocity. User device 100 may determine that user device 100 is moving in vehicle 330 if a velocity of user device 100 exceeds a threshold velocity, as indicated by reference number 350. For example, if the velocity of user device 100 is greater than a threshold velocity of about fifteen (15) to twenty (20) miles per hour, user device 100 may determine that user device 100 is moving in vehicle 330. If user device 100 is determined to be moving in vehicle 330, user device 100 may be placed in the semi-locked state. The semi-locked state may permit some user device 100 functionality (e.g., placing a phone call) with one hand, but may prevent other user device 100 functionality (e.g., texting, features that require menu operations, features that require keypad operations, etc.) with one hand. When user device 100 is in the semi-locked state, a user may utilize one hand to continuously contact a soft button (e.g., provided on a menu or keypad displayed by display 120 of user device 100) or a hard button (e.g., a mechanical keypad key, a camera button, etc. of user device 100). The semi-locked state of user device 100 may be disabled while the soft button or hard button is continuously contacted, and the user may utilize another hand to access the other functionality of user device 100.

In one example implementation, user device 100 may receive (e.g., via communication interface 230 and antenna assembly 240) or may retrieve (e.g., from memory 210) location information associated with user device 100, travel purchases associated with user device 100, calendar information associated with user device 100, relative location of user device 100 to a wireless hotspot, etc. The location information may include a physical location of user device 100 (e.g., as provided by GPS coordinates of user device 100), which may indicate whether user device 100 is on a highway, on a railway, in a building, on a road, on a sidewalk, not near a highway or road, etc. The travel purchases information may provide an indication of whether the user of user device 100 purchased a bus ticket, a train ticket, a plane ticket, etc. for a particular day. The calendar information may provide an indication of whether the user of user device 100 is taking a business trip in a motor vehicle, is not traveling, is traveling via train or bus, etc. on a particular day. The calendar information may also include information provided by the user to social media web sites (e.g., Facebook™, Twitter™, Linkedin™, etc.), which may provide an indication of whether user device 100 is or is not traveling in a moving motor vehicle. The relative location information may include information providing a relative location of user device 100 to a wireless hotspot based on a signal strength received by the wireless hotspot from user device 100.

If the velocity of user device 100 is greater than the threshold velocity, user device 100 may further determine whether user device 100 is provided in a moving motor vehicle based on the retrieved/received information. For example, if the location information indicates that user device 100 is located on a highway and is moving at a velocity greater than the threshold velocity, user device 100 may determine that user device 100 is provided in a moving motor vehicle. Alternatively, or additionally, if the travel purchases information and/or the calendar information indicate that the user is traveling on a train at a particular time, user device 100 may determine that user device 100 is not in a moving motor vehicle at the particular time. Alternatively, or additionally, if a wireless hotspot is located in a moving motor vehicle and the relative location information indicates that user device 100 is very close to the wireless hotspot, user device may be determined to be provided in a moving motor vehicle.

In one example implementation, if the velocity of user device 100 is greater than the threshold velocity, user device 100 may determine whether user device 100 is provided in a moving motor vehicle based on confidence levels associated with the retrieved/received information. In one example, the retrieved/received information may be given different confidence level weights. For instance, the location information may be given a much higher confidence level weight than one or more confidence level weights given to the other retrieved/received information. In such a situation, if the location information indicates that user device 100 is on a highway at a particular time, and the calendar information indicates that the user is supposed to have a meeting at the user's workplace at the particular time, user device 100 may determine that user device 100 is provided in a moving motor vehicle despite the calendar information. Alternatively, or additionally, the retrieved/received information may be given equal confidence level weights.

If the velocity of user device 100 is greater than the threshold velocity and user device 100 is determined to be in a moving motor vehicle based on the retrieved/received information, user device 100 may be placed in the semi-locked state. However, if the velocity of user device 100 is greater than the threshold velocity but user device 100 is determined to not be in a moving motor vehicle based on the retrieved/received information, all of the functionality of user device 100 may be maintained.

Although FIG. 3 shows example use scenarios 300 associated with user device 100, in other implementations, user device 100 may be included in different use scenarios and/or additional use scenarios than those depicted in FIG. 3. For example, user device 100 may utilize other types of information in order to determine whether user device 100 is provided in a moving motor vehicle, such as information received from a motor vehicle when user device 100 is synchronized with a computer system of the motor vehicle.

Figure 4A:
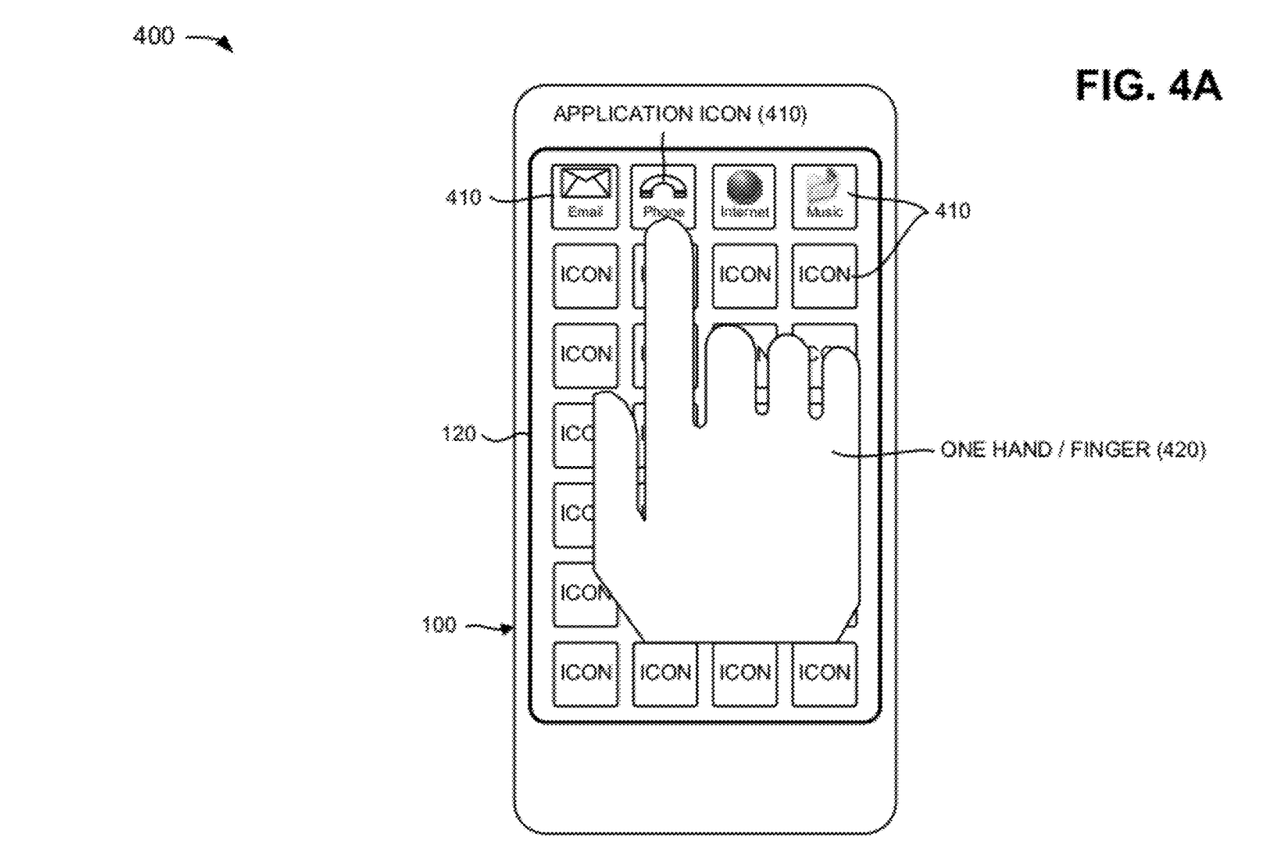
FIGS. 4A and 4B are diagrams of example user interfaces capable of being generated or provided by a stationary user device.
Figure 4B:
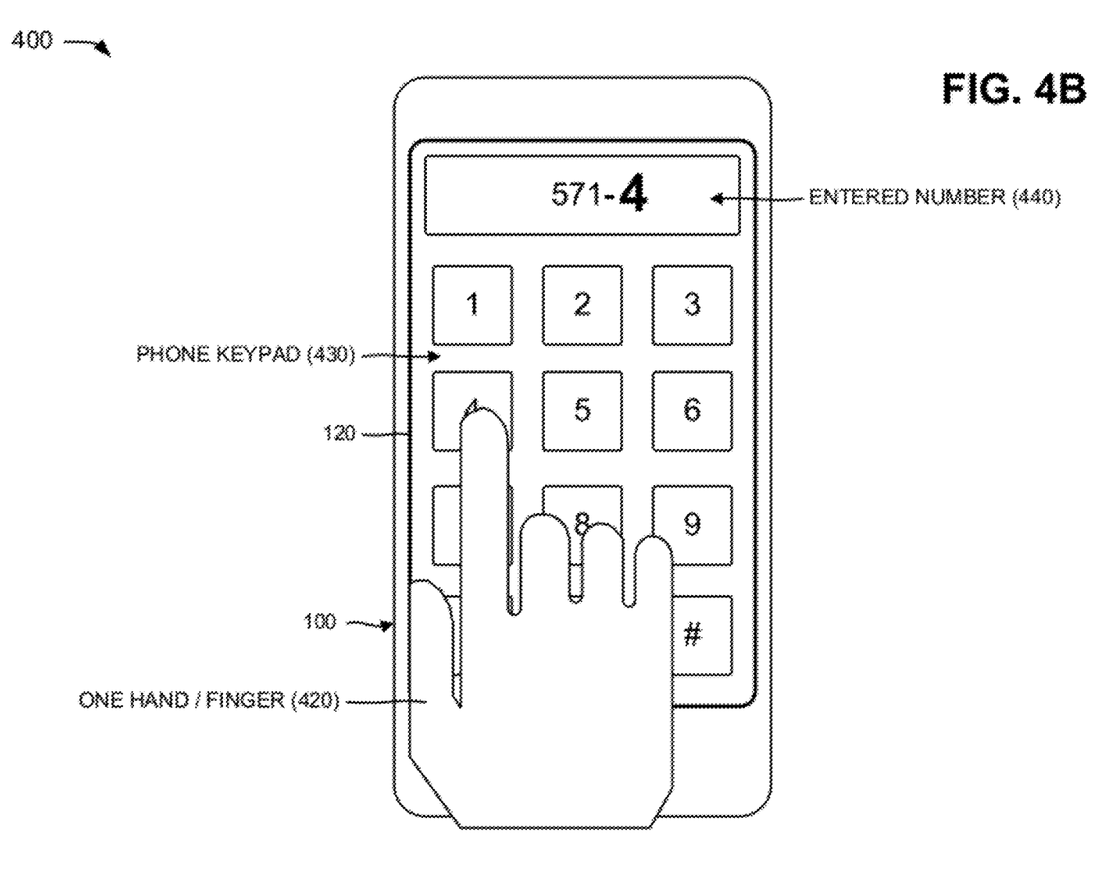

FIGS. 4A and 4B are diagrams of example user interfaces 400 capable of being generated or provided by a stationary user device 100, such as the stationary user device 100 depicted in FIG. 3 by reference number 320. In one example implementation, user interfaces 400 may depict functionality associated with user device 100 when user device 100 is not in the semi-locked state. User interfaces 400 depicted in FIGS. 4A and 4B, as well as the user interfaces depicted in FIGS. 5-7 (hereinafter referred to collectively as "the user interfaces") may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices (e.g., display 120, FIG. 1), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of user device 100 (e.g., via a touch screen display, a mouse, a keyboard, a keypad, voice commands, etc.).

As shown in FIG. 4A, display 120 may display one or more display elements. In one example implementation, the display elements may include application icons 410 associated with executable applications (e.g., an icon for an email application, an icon for a telephone application, an icon for an Internet application, an icon for a music application, etc.) capable of being executed by user device 100. Each of icons 410 may display information associated with the executable application corresponding to each of icons 410.

As further shown in FIG. 4A, a user may attempt to manipulate display 120 (e.g., via one hand or finger 420 associated with the user), and user device 100 may sense or detect hand/finger 420 being in contact with and/or being adjacent to display 120. User device 100 may calculate a selected application icon 410 associated with the detected hand/finger 420, and may execute the application associated with the selected icon 410. For example, as shown in FIG. 4A, the user's hand/finger 420 may select a "Phone" icon 410, and user device 100 may execute the "Phone" application associated with the "Phone" icon 410.

As shown in FIG. 4B, execution of the "Phone" application may cause user device 100 to display (e.g., via display 120) a standard telephone keypad 430 that includes keys and enables the user to input a telephone number. As further shown in FIG. 4B, if a user attempts to manipulate keypad 430 (e.g., via hand/finger 420), user device 100 may sense or detect hand/finger 420 being in contact with and/or being adjacent to display 120. User device 100 may display a currently entered number 440 provided by the user via keypad 430. For example, since hand/finger 420 may select a "4" key, user device 100 may display a "4" in a portion of display 120.

Figure 5:
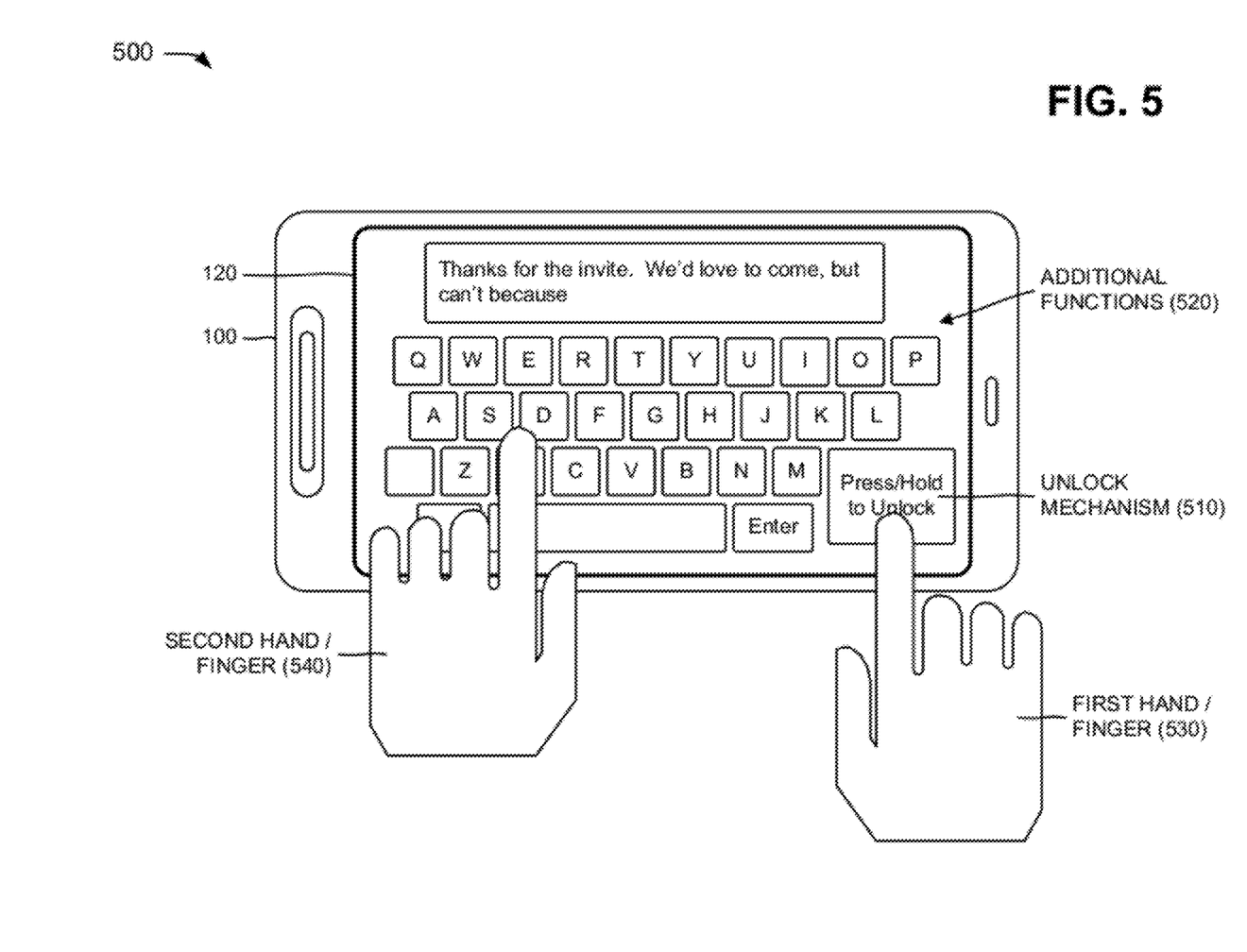
FIG. 5 is a diagram of an example user interface capable of being generated or provided by a moving user device.

FIG. 5 is a diagram of an example user interface 500 capable of being generated or provided by a moving user device 100, such as the moving user device 100 depicted in FIG. 3 by reference number 350. In one example implementation, user interface 500 may depict functionality associated with user device 100 when user device 100 is in the semi-locked state. For example, user interface 500 may be displayed by user device 100 when a velocity of user device 100 is greater than a threshold velocity and user device 100 is determined to be in a moving motor vehicle based on the retrieved/received information.

As further shown in FIG. 5, display 120 of user device 100 may display an unlock mechanism 510 and additional functions 520 when user device 100 is in the semi-locked state. Unlock mechanism 510 may include a button, a link, an icon, or some other display element that, when continuously selected, enables a user to utilize additional functions 520 of user device 100. Additional functions 520 may include texting applications, email applications, applications providing access to the Internet, applications providing access to social media web sites, and/or other applications that may be distracting to an operator of a motor vehicle.

As shown in FIG. 5, the user of user device 100 may select and hold unlock mechanism 510 with a first hand or finger 530, and may utilize additional functions 520 with a second hand or finger 540. By selecting and holding unlock mechanism 510, the user may cause user device 100 to disable the semi-locked state. Such an arrangement may prevent a driver of a motor vehicle from utilizing functionality of user device 100 that is distracting since the driver may need at least one hand (e.g., second hand/finger 540) to operate the motor vehicle. Passengers in a motor vehicle may still be able access all of the functionality of user device 100 since the passengers may have both hands (e.g., first hand/finger 530 and second hand/finger 540) free to disable the semi-locked state and to manipulate user device 100.

Figure 6:
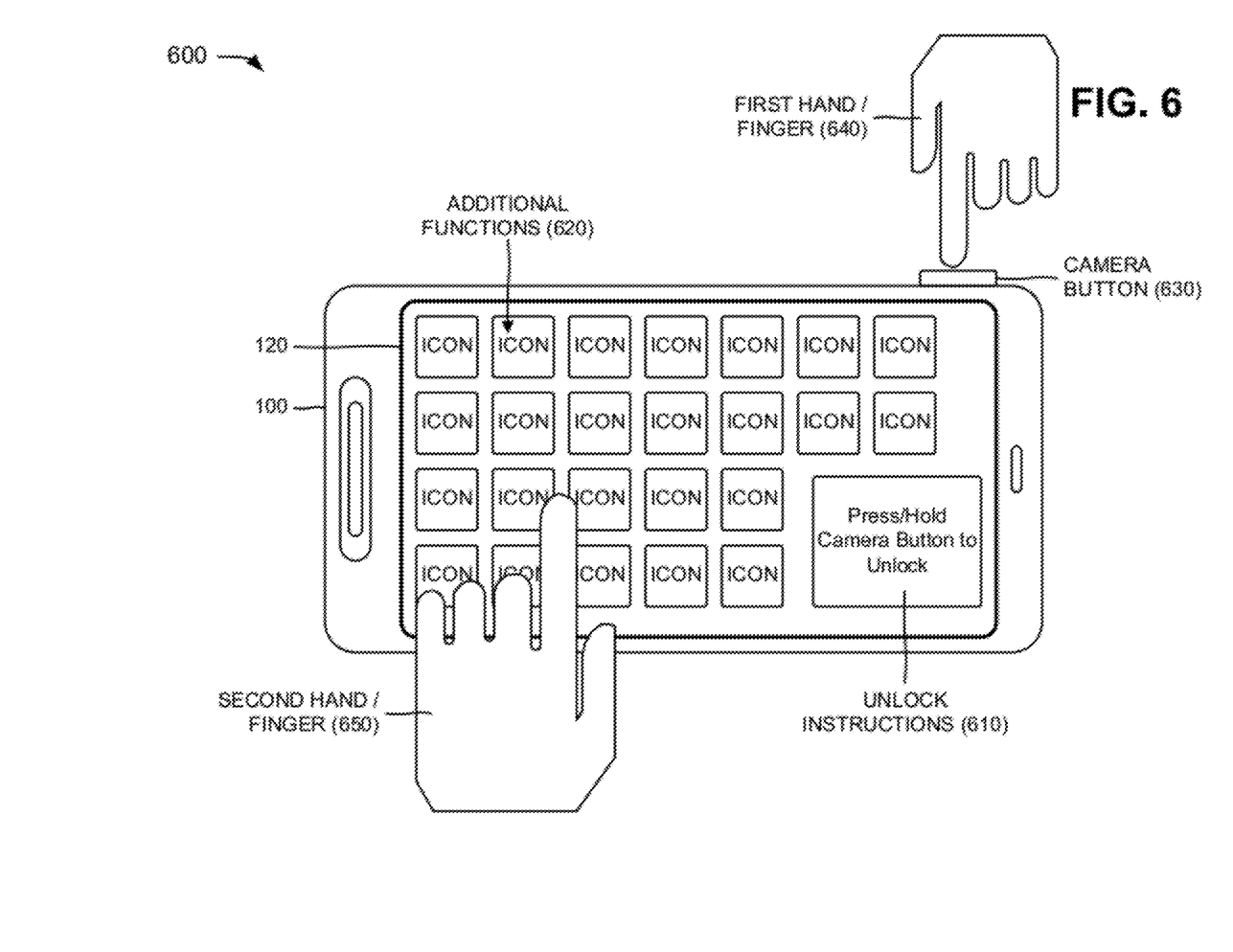
FIG. 6 is a diagram of another example user interface capable of being generated or provided by a moving user device.

FIG. 6 is a diagram of another example user interface 600 capable of being generated or provided by a moving user device 100, such as the moving user device 100 depicted in FIG. 3 by reference number 350. In one example implementation, user interface 600 may depict functionality associated with user device 100 when user device 100 is in the semi-locked state. For example, user interface 600 may be displayed by user device 100 when a velocity of user device 100 is greater than a threshold velocity and user device 100 is determined to be in a moving motor vehicle based on the retrieved/received information.

As further shown in FIG. 6, display 120 of user device 100 may display unlock instructions 610 and additional functions 620 when user device 100 is in the semi-locked state. Unlock instructions 610 may include instructions for disabling the semi-locked state of user device 100. For example, unlock instructions 610 may instruct the user to select and hold a camera button 630 of user device 100 in order to disable the semi-locked state of user device 100. Camera button 630 may include a button associated with a camera function of user device 100. When continuously selected, camera button 630 may enable a user to utilize additional functions 620 of user device 100. Additional functions 620 may include texting applications, email applications, applications providing access to the Internet, applications providing access to social media web sites, and/or other applications that may be distracting to an operator of a motor vehicle.

As shown in FIG. 6, the user of user device 100 may select and hold camera button 630 with a first hand or finger 640, and may utilize additional functions 620 with a second hand or finger 650. By selecting and holding camera button 630, the user may cause user device 100 to disable the semi-locked state. Such an arrangement may prevent a driver of a motor vehicle from utilizing functionality of user device 100 that is distracting since the driver may need at least one hand (e.g., second hand/finger 650) to operate the motor vehicle. Passengers in a motor vehicle may still be able access all of the functionality of user device 100 since the passengers may have both hands (e.g., first hand/finger 640 and second hand/finger 650) free to disable the semi-locked state and to manipulate user device 100.

Figure 7:
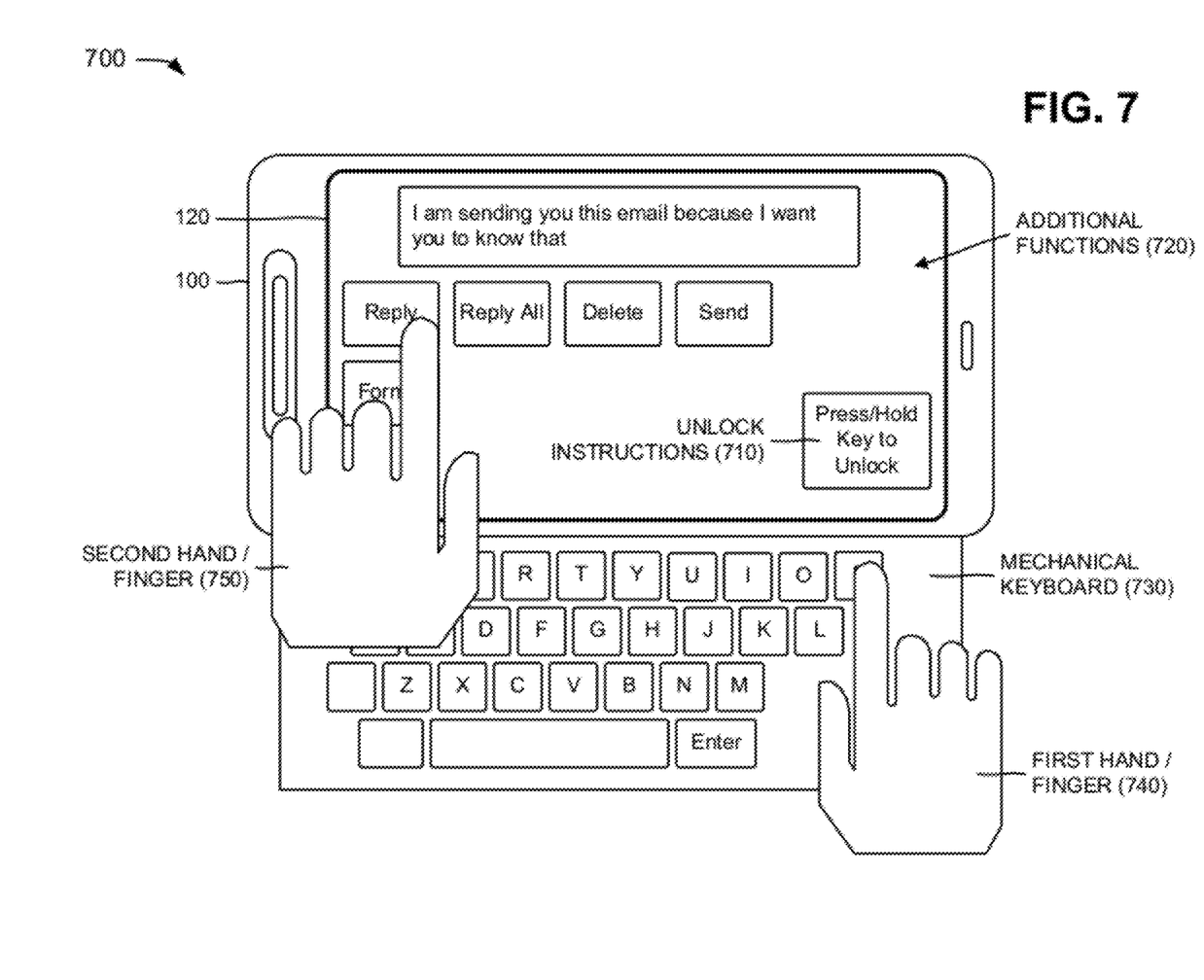
FIG. 7 is a diagram of still another example user interface capable of being generated or provided by a moving user device.

FIG. 7 is a diagram of still another example user interface 700 capable of being generated or provided by a moving user device 100, such as the moving user device 100 depicted in FIG. 3 by reference number 350. In one example implementation, user interface 700 may depict functionality associated with user device 100 when user device 100 is in the semi-locked state. For example, user interface 700 may be displayed by user device 100 when a velocity of user device 100 is greater than a threshold velocity and user device 100 is determined to be in a moving motor vehicle based on the retrieved/received information.

As further shown in FIG. 7, display 120 of user device 100 may display unlock instructions 710 and additional functions 720 when user device 100 is in the semi-locked state. Unlock instructions 710 may include instructions for disabling the semi-locked state of user device 100. For example, unlock instructions 710 may instruct the user to select and hold a particular key of a mechanical keyboard 730 of user device 100 in order to disable the semi-locked state of user device 100. Mechanical keyboard 730 may include a slide out keyboard or keypad, a flip type keyboard or keypad, etc. When continuously selected, the particular key of mechanical keyboard 730 may enable a user to utilize additional functions 720 of user device 100. Additional functions 720 may include texting applications, email applications, applications providing access to the Internet, applications providing access to social media web sites, and/or other applications that may be distracting to an operator of a motor vehicle.

As shown in FIG. 7, the user of user device 100 may select and hold the particular key of mechanical keyboard 730 with a first hand or finger 740, and may utilize additional functions 720 with a second hand or finger 750. By selecting and holding the particular key of mechanical keyboard 730, the user may cause user device 100 to disable the semi-locked state. Such an arrangement may prevent a driver of a motor vehicle from utilizing functionality of user device 100 that is distracting since the driver may need at least one hand (e.g., second hand/finger 750) to operate the motor vehicle. Passengers in a motor vehicle may still be able access all of the functionality of user device 100 since the passengers may have both hands (e.g., first hand/finger 740 and second hand/finger 750) free to disable the semi-locked state and to manipulate user device 100.

Although the user interfaces of FIGS. 4A-7 depict a variety of information, in other implementations, the user interfaces may depict less information, different information, differently arranged information, or additional information than depicted in FIGS. 4A-7.

Figure 8:
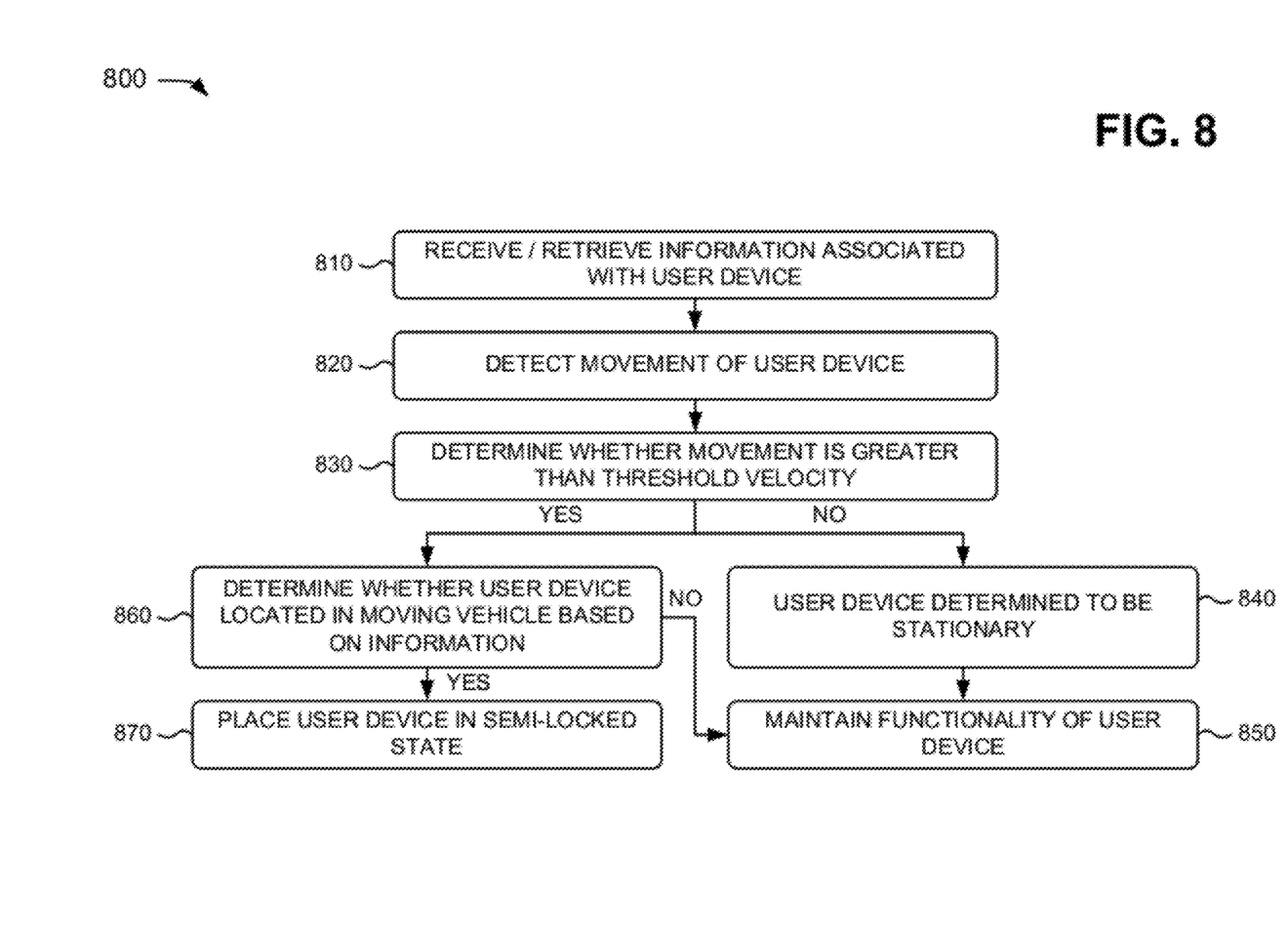
FIGS. 8-10 are flow charts of an example process for limiting user device functionality during motor vehicle operation according to an implementation described herein.
Figure 9:
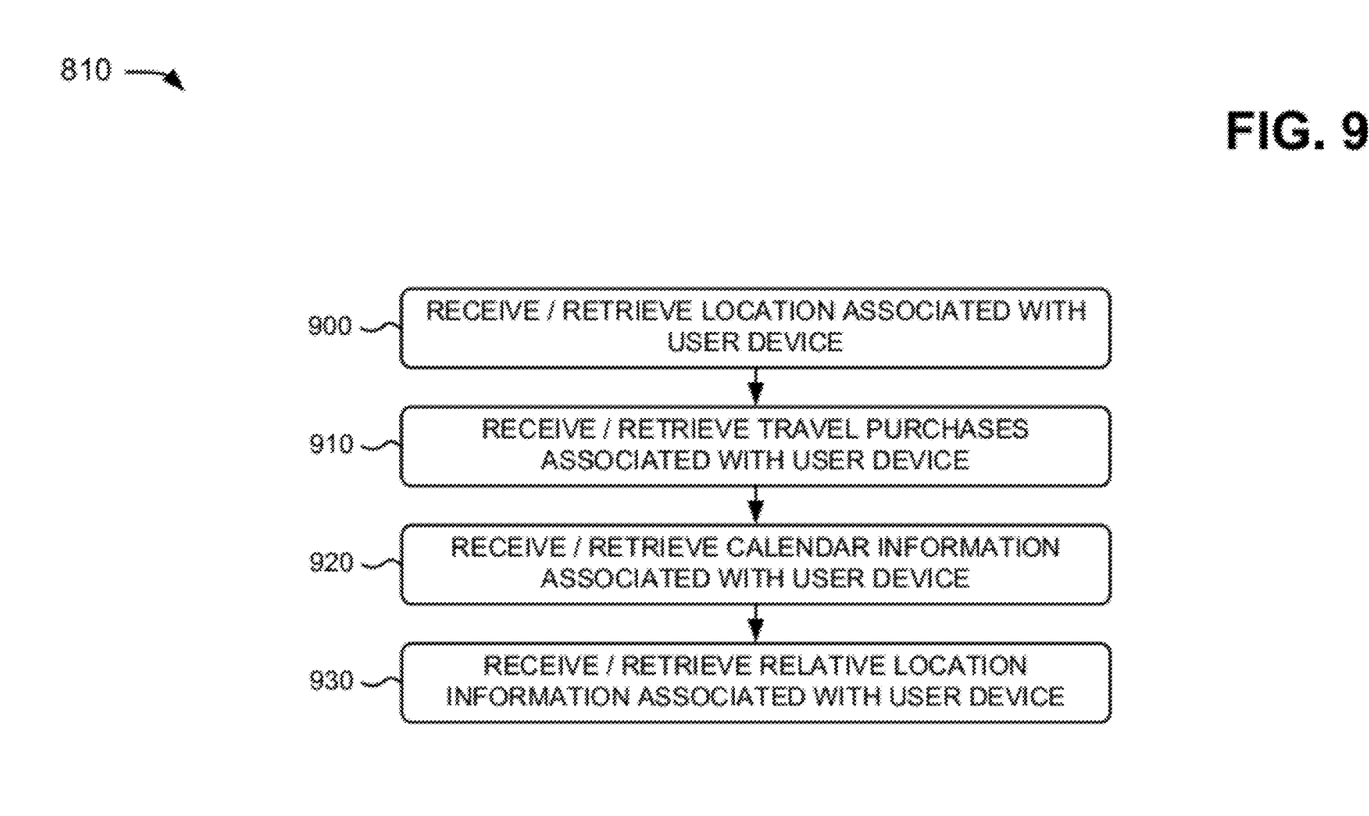
Figure 10:
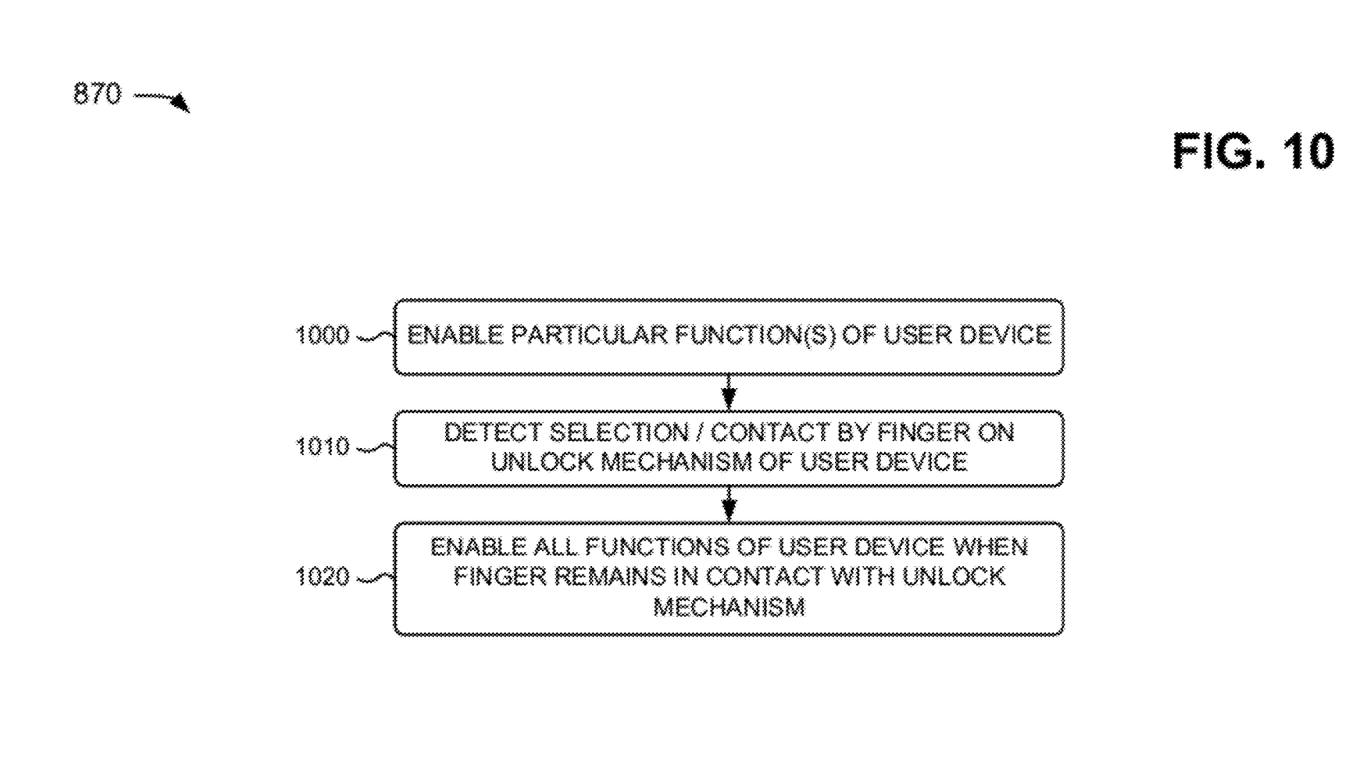

FIGS. 8-10 are flow charts of an example process 800 for limiting user device functionality during motor vehicle operation according to an implementation described herein. In one implementation, process 800 may be performed by user device 100. Alternatively, or additionally, some or all of process 800 may be performed by another device or group of devices, including or excluding user device 100.

As shown in FIG. 8, process 800 may include receiving and/or retrieving information associated with a user device (block 810), and detecting movement of the user device (block 820). For example, in an implementation described above in connection with FIG. 3, user device 100 may receive or may retrieve location information associated with user device 100, travel purchases associated with user device 100, calendar information associated with user device 100, relative location of user device 100 to a wireless hotspot, etc. The location information may include a physical location of user device 100, which may indicate whether user device 100 is on a highway, on a railway, in a building, on a road, on a sidewalk, not near a highway or road, etc. The travel purchases information may provide an indication of whether the user of user device 100 purchased a bus ticket, a train ticket, a plane ticket, etc. for a particular day. The calendar information may provide an indication of whether the user of user device 100 is taking a business trip in a motor vehicle, is not traveling, is traveling via train or bus, etc. on a particular day. User device 100 may detect movement of user device 100 based on information received from monitoring devices 250.

As further shown in FIG. 8, process 800 may include determining whether the movement of the user device is greater than threshold velocity (block 830). For example, in an implementation described above in connection with FIG. 3, user device 100 may determine whether user device 100 is moving greater than a threshold velocity. User device 100 may determine that user device 100 is moving in vehicle 330 if a velocity of user device 100 exceeds a threshold velocity, as indicated by reference number 350. For example, if the velocity of user device 100 is greater than a threshold velocity of about fifteen (15) to twenty (20) miles per hour, user device 100 may determine that user device 100 is moving in vehicle 330.

Returning to FIG. 8, if the movement is less than or equal to the threshold velocity (block 830—NO), process 800 may include determining that the user device is stationary (block 840) and maintaining functionality of the user device (block 850). For example, in an implementation described above in connection with FIG. 3, if the velocity of user device 100 is less than or equal to a threshold velocity of about fifteen (15) to twenty (20) miles per hour, user device 100 may determine that user device 100 is stationary. If user device 100 is determined to be stationary, all of the functionality of user device 100 may be maintained. In other words, user device 100 may not be placed in the semi-locked state when user device 100 is determined to be stationary.

As further shown in FIG. 8, if the movement is greater than the threshold velocity (block 830—YES), process 800 may include determining whether the user device is located in a moving vehicle based on the information (block 860). If the user device is located in a moving vehicle (block 860—YES), process 800 may include placing the user device in a semi-locked state (block 870). If the user device is not located in a moving vehicle (block 860—NO), process 800 may include maintaining the functionality of the user device (block 850). For example, in an implementation described above in connection with FIG. 3, if the velocity of user device 100 is greater than the threshold velocity, user device 100 may further determine whether user device 100 is provided in a moving motor vehicle based on the retrieved/received information. In one example, if the location information indicates that user device 100 is located on a highway and is moving at a velocity greater than the threshold velocity, user device 100 may determine that user device 100 is provided in a moving motor vehicle. If the velocity of user device 100 is greater than the threshold velocity and user device 100 is determined to be in a moving motor vehicle based on the retrieved/received information, user device 100 may be placed in the semi-locked state. However, if the velocity of user device 100 is greater than the threshold velocity but user device 100 is determined to not be in a moving motor vehicle based on the retrieved/received information, all of the functionality of user device 100 may be maintained.

Process block 810 may include the process blocks depicted in FIG. 9. As shown in FIG. 9, process block 810 may include receiving/retrieving a location associated with the user device (block 900), receiving/retrieving travel purchases associated with the user device (block 910), receiving/retrieving calendar information associated with the user device (block 920), and receiving/retrieving relative location information associated with the user device (block 930). For example, in an implementation described above in connection with FIG. 3, user device 100 may receive or may retrieve location information associated with user device 100, travel purchases associated with user device 100, calendar information associated with user device 100, relative location of user device 100 to a wireless hotspot, etc. The location information may include a physical location of user device 100, which may indicate whether user device 100 is on a highway, on a railway, in a building, on a road, on a sidewalk, not near a highway or road, etc. The travel purchases information may provide an indication of whether the user of user device 100 purchased a bus ticket, a train ticket, a plane ticket, etc. for a particular day. The calendar information may provide an indication of whether the user of user device 100 is taking a business trip in a motor vehicle, is not traveling, is traveling via train or bus, etc. on a particular day. The calendar information may also include information provided by the user to social media web sites, which may provide an indication of whether user device 100 is or is not traveling in a moving motor vehicle. The relative location information may include information providing a relative location of user device 100 to a wireless hotspot based on a signal strength received by the wireless hotspot from user device 100.

Process block 870 may include the process blocks depicted in FIG. 10. As shown in FIG. 10, process block 870 may include enabling particular function(s) of the user device (block 1000), detecting selection and/or contact by a finger on an unlock mechanism of the user device (block 1010), and enabling all functions of the user device when the finger remains in contact with the unlock mechanism (block 1020). For example, in an implementation described above in connection with FIGS. 3 and 5, the semi-locked state may permit some user device 100 functionality (e.g., placing a phone call) with one hand, but may prevent other user device 100 functionality (e.g., texting, features that require menu operations, features that require keypad operations, etc.) with one hand. The user of user device 100 may select and hold unlock mechanism 510 with first hand/finger 530, and may utilize additional functions 520 with second hand/finger 540. By selecting and holding unlock mechanism 510, the user may cause user device 100 to disable the semi-locked state.

Systems and/or methods described herein may enable a user device to enter a semi-locked state when the user device is determined to be located within a moving motor vehicle. The semi-locked state may permit some user device functionality with one hand, but may prevent other user device functionality with one hand. However, when the user device is in the semi-locked state, a user may utilize the other user device functionality with two hands. For example, the user may utilize one hand to continuously contact a soft button or a hard button. The semi-locked state of the user device may be disabled while the soft button or hard button is continuously contacted, and the user may utilize another hand to access the other user device functionality.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 8-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    maintaining, by a user device, functionality of the user device when the user device is not located in a moving vehicle;
    receiving, by the user device, information associated with the user device,
        the information including travel purchase information associated with the user device;
    detecting, by the user device, movement of the user device;
    determining, by the user device, whether the movement is greater than a threshold velocity;
    determining, when the movement is greater than the threshold velocity, whether the user device is located in the moving vehicle based on the information associated with the user device;
    placing the functionality of the user device into a semi-locked state when the user device is located in a moving vehicle;
    providing for display, by the user device, an unlock mechanism on a display of the user device when the functionality of the user device is in the semi-locked state,
        the unlock mechanism including at least one of an icon, a link, or a button;
    enabling, by the user device, particular functions of the user device when the functionality of the user device is in the semi-locked state;
    detecting, by the user device, a first contact, by a user of the user device, on the unlock mechanism;
    enabling, by the user device, additional functions of the user device when the first contact remains in contact with the unlock mechanism,
        the additional functions being different from the particular functions;
    detecting, by the user device, a second contact, by the user, on one or more keys associated with one of the additional functions; and
    performing, by the user device, the one of the additional functions based on the second contact on the one or more keys.

2. The method of claim 1, further comprising:
    determining that the user device is stationary when the movement is less than or equal to the threshold velocity; and
    maintaining the functionality of the user device when the user device is determined to be stationary.

3. The method of claim 1, where the information further includes:
calendar information associated with the user device.

4. A user device comprising:
a processor to:
maintain functionality of the user device when the user device is not located in a moving vehicle;
receive information associated with the user device,
detect movement associated with the user device,
determine whether the movement is greater than a threshold velocity,
determine, when the movement is greater than the threshold velocity, whether the user device is located in the moving vehicle based on the information associated with the user device,
place the functionality of the user device into a semi-locked state when the user device is located in a moving vehicle,
the semi-locked state preventing a user of the user device from utilizing texting applications, email applications, and Internet-based applications,
provide for display an unlock mechanism on a display of the user device when the functionality of the user device is in the semi-locked state,
the unlock mechanism including at least one of an icon, a link, or a button,
enable particular functions of the user device when the functionality of the user device is in the semi-locked state,
detect additional functions of the user device when the first finger remains in contact with the unlock mechanism,
the additional functions being different from the particular functions,
detect contact by a second finger, of a second hand, on one or more keys associated with one of the additional functions, and
perform the one of the additional functions based on the contact of the second finger on the one or more keys.

5. The user device of claim 4, where the processor is further to:
maintain the functionality of the user device when the movement is less than or equal to the threshold velocity.

6. The user device of claim 4, where the information includes one or more of:
travel purchases information associated with the user device, or calendar information associated with the user device.

7. A non-transitory computer-readable medium comprising:
one or more instructions that, when executed by a processor of a user device, cause the processor to:
maintain functionality of the user device when the user device is not located in a moving vehicle,
retrieve information associated with the user device,
detect movement of the user device,
determine whether the movement is greater than a threshold velocity,
determine, when the movement is greater than the threshold velocity, whether the user device is located in the moving vehicle based on the information associated with the user device, and
place the functionality of the user device into a semi-locked state when the user device is located in the moving vehicle,
provide for display an unlock mechanism on a display of the user device when the functionality of the user device is in the semi-locked state,
the unlock mechanism including at least one of an icon, a link, or a button,
enable particular functions of the user device when the functionality of the user device is in the semi-locked state,
detect contact by a first finger, of a first hand, on the unlock mechanism,
enable specific functions of the user device when the when the first finger remains in contact with the unlock mechanism,
the specific functions being different from the particular functions,
detect contact by a second finger, of a second hand, on one or more keys associated with one of the specific functions, and
perform the one of the specific functions based on the contact of the second finger on the one or more keys.

8. The computer-readable medium of claim 7, further comprising:
one or more instructions that, when executed by the processor of the user device, cause the processor to:
determine that the user device is stationary when the movement is less than or equal to the threshold velocity, and
maintain the functionality of the user device when the user device is stationary.

9. The computer-readable medium of claim 7, where the information includes one or more of:
travel purchase information associated with the user device, or
calendar information associated with the user device.

10. The method of claim 1, where the travel purchase information includes an indication regarding whether a user of the user device is traveling on a particular day.

11. The method of claim 1, where the additional functions include one or more of a texting application, an email application, or an Internet-based application.

12. The method of claim 1, where the particular functions include a phone application.

13. The method of claim 1,
where the first contact is by a first hand of the user, and
where the second contact is by a second hand of the user.

14. The method of claim 1, where displaying the unlock mechanism includes:
displaying unlock instructions on a display of the user device,
the unlock instructions instructing a user, of the user device, to select and hold the unlock mechanism.

15. The user device of claim 4, where the additional functions include one or more functions that require at least one of menu operations or keypad operations.

16. The user device of claim 4, where the additional functions include one or more of a texting application, an email application, or an Internet-based application.

17. The user device of claim 4, where the particular functions include a phone application.

18. The user device of claim 4, where, when displaying the unlock mechanism, the processor is to:
provide for display instructions that instruct a user, of the user device, to select and hold the unlock mechanism.

19. The computer-readable medium of claim 7, where the additional functions include one or more functions that require at least one of menu operations or keypad operations.

20. The computer-readable medium of claim 7, where the particular functions include a phone application.

21. The computer-readable medium of claim 7, where the one or more instructions to display the unlock mechanism include:

one or more instructions that, when executed by the processor of the user device, cause the processor to:

provide for display instructions that instruct a user, of the user device, to select and hold the unlock mechanism.

* * * * *